United States Patent
Wan

(10) Patent No.: US 11,902,779 B1
(45) Date of Patent: Feb. 13, 2024

(54) SYSTEMS AND METHODS TO AUTHENTICATE A NON-FIFTH GENERATION CAPABLE DEVICE ON A RESIDENTIAL GATEWAY

(71) Applicant: CABLE TELEVISION LABORATORIES, INC., Louisville, CO (US)

(72) Inventor: Tao Wan, Ottawa (CA)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 305 days.

(21) Appl. No.: 17/492,973

(22) Filed: Oct. 4, 2021

Related U.S. Application Data

(60) Provisional application No. 63/111,162, filed on Nov. 9, 2020, provisional application No. 63/087,088, filed on Oct. 2, 2020.

(51) Int. Cl.
*H04W 12/06* (2021.01)
*H04W 88/16* (2009.01)
*H04W 84/04* (2009.01)

(52) U.S. Cl.
CPC .......... *H04W 12/06* (2013.01); *H04W 84/042* (2013.01); *H04W 88/16* (2013.01)

(58) Field of Classification Search
CPC .. H04W 12/06; H04W 36/00222; H04L 9/40; H04L 9/3273
USPC .......................................................... 726/3
See application file for complete search history.

(56) References Cited

U.S. PATENT DOCUMENTS

| | | | | |
|---|---|---|---|---|
| 11,395,139 | B1* | 7/2022 | Paczkowski | H04W 12/12 |
| 11,616,611 | B1* | 3/2023 | Stoica | H04L 5/0023 |
| | | | | 375/267 |
| 2018/0083972 | A1* | 3/2018 | Kim | H04L 41/0853 |
| 2020/0389775 | A1* | 12/2020 | Ravichandran | H04W 4/60 |
| 2022/0109916 | A1* | 4/2022 | Tan | H04W 12/63 |
| 2022/0159455 | A1* | 5/2022 | Paczkowski | H04W 12/0431 |
| 2022/0312181 | A1* | 9/2022 | Sumien | H04M 15/8228 |
| 2023/0100395 | A1* | 3/2023 | Yadav | H04W 12/08 |
| | | | | 370/392 |

\* cited by examiner

*Primary Examiner* — Teshome Hailu
(74) *Attorney, Agent, or Firm* — Polsinelli PC

(57) ABSTRACT

Systems and methods to authenticate a Non-Fifth Generation Capable (N5GC) device on a Residential Gateway (RG) include a wireline access network comprising the RG and a wireline-access gateway function (W-AGF). The RG connects to the W-AGF using a termination system (e.g., a Cable Modem Termination System (CMTS) and the like) to relay N5GC device messages received at the RG to the W-AGF and vice versa. During a registration/authentication procedure for the N5GC device, the W-AGF generates a Registration Request message on behalf of the N5GC device and sends the Registration Request message to an Access & Mobility Management Function (AMF) of a Fifth Generation (5G) core network. The Registration Request message includes an indication that the N5GC device lacks 5G capabilities (e.g., is N5GC). In response to the Registration Request message, the system causes the N5GC device to be authenticated at least partly in response to the Registration Request message.

21 Claims, 4 Drawing Sheets

SYSTEMS AND METHODS TO AUTHENTICATE A NON-FIFTH GENERATION CAPABLE DEVICE ON A RESIDENTIAL GATEWAY

CROSS-REFERENCE TO RELATED APPLICATIONS

The present application claims priority under 35 U.S.C. § 119 to U.S. Provisional Application No. 63/087,088, entitled "Authentication For Non-5G Capable Devices Behind Residential Gateway" and filed on Oct. 2, 2020, and to U.S. Provisional Application No. 63/111,162, entitled "Authentication For Non-5G Capable Devices Behind Residential Gateway" and filed on Nov. 9, 2020. Each of these applications is specifically incorporated by reference herein in its entirety.

FIELD

Aspects of the presently disclosed technology relate generally to device authentication for Third Generation Partnership Project (3GPP) networks and more particularly to authenticating a Non-Fifth Generation Capable (NSGC) device for a Fifth Generation (5G) network.

BACKGROUND

3GPP technology deployments, such as 5G deployments, provide access to improved networks with increased bandwidth capacities, faster connectivity, lower latency, and other enhanced qualities. A 5G capable device, such as a mobile phone or user equipment (UE), typically uses a 5G radio chipset, a 5G-configured subscriber identity module (SIM), or other modules with specific 5G configurations to gain access to the 5G network. Many devices, including those outside the mobile device category, are designed without 5G connectivity (e.g., desktop computers, laptop computers, Internet-of-Things (IoT) devices, legacy UEs, etc.). These devices lack the hardware and software components to perform access network registration and authentication procedures with the 5G network and, therefore, cannot realize the benefits of 5G deployments.

It is with these observations in mind, among others, that various aspects of the present disclosure were conceived and developed.

SUMMARY

Implementations described and claimed herein address the foregoing with techniques to authenticate a Non-5G capable (NSGC) device on a residential gateway for a 5G core network. For instance, a method to authenticate a Non-Fifth Generation Capable (NSGC) device with a 5G core network can comprise: sending an Identity Request message from a wireline-access gateway function (W-AGF) to the N5GC device, the W-AGF being connected to the N5GC device through a residential gateway (RG); receiving, at the W-AGF, an Identity Response message including a device identifier associated with the N5GC device; generating, at the W-AGF and on behalf of the N5GC device, a Registration Request message including an N5GC indication; sending the Registration Request message to an Access & Mobility Management Function (AMF) of the 5G core network; receiving, at the W-AGF and from the AMF, an Authentication Request message associated with the 5G core network in response to the Registration Request message; and forwarding the Authentication Request message associated with the 5G core network to the N5GC device to cause the N5GC device to be authenticated for the 5G core network.

In some examples, causing the N5GC device to be authenticated for the 5G core network includes validating, at the N5GC device, a server certificate associated with the 5G core network included in the Authentication Request message. The Identity Request message can be an Extensible Authentication Protocol (EAP) Request/Identity message. Furthermore, the Registration Request message can include a Subscription Permanent Identifier (SUPI) based on a Network Access Identifier (NAI) associated with the N5GC device. In some instances, the NAI includes a username portion and a domain portion. The W-AGF can generate the Registration Request message at least partly in response to the domain portion of the NAI. Additionally or alternatively, the W-AGF can generate the Registration Request message at least partly in response to the username portion of the NAI.

In some instances, generating the Registration Request message includes adding the N5GC indication to a message based at least partly on a Third Generation Partnership Project (3GPP) standard to authenticate devices behind 5G-Cable Residential Gateways (5G-CRG)s and Fixed Network-Cable Residential Gateways (FN-CRG)s. Moreover, the RG can connect to the W-AGF using a termination system. The termination system can include a Cable Modem Termination System (CMTS) device, on Optical Line Termination (OLT) device, or a Digital Subscriber Line (DSL) termination device. Additionally, the termination system can be collocated with the W-AGF at a Central Office (CO) associated with the 5G core network. By way of example, the N5GC device can connect to the W-AGF via the RG which is a layer 2 bridge mode or layer 3 gateway mode.

In some examples, a method to authenticate a Non-Fifth Generation Capable (N5GC) device with a 5G core network comprises: generating, at a W-AGF, a Registration Request message on behalf of the N5GC device and in response to an Identity Response message associated with the N5GC device, the Registration Request message including a Subscription Concealed Identifier (SUCI) associated with the N5GC device and an N5GC indication; sending the Registration Request message from the W-AGF to an Access & Mobility Management Function (AMF) of the 5G core network; sending, using the AMF, a first Authentication Request message to an Authentication Server Function (AUSF) of the 5G core network based on the SUCI associated with the N5GC device, the first Authentication Request message including the SUCI and the N5GC indication; selecting, at least partly in response to the first Authentication Request message, an authentication type for the N5GC device; receiving, at the W-AGF and from the AMF, a second Authentication Request message associated with the 5G core network including an indication of the authentication type; and forwarding the second Authentication Request message associated with the 5G core network to the N5GC device to cause the N5GC device to be authenticated for the 5G core network.

In some instances, the second Authentication Request message omits a key set identifier and an Anti-Bidding-down Between Architecture (ABBA) parameter in response to the N5GC indication. The method can further include constructing, at the W-AGF, a Subscription Concealed Identifier (SUCI) using a Network Access Identifier (NAI) as a Subscription Permanent Identifier (SUPI) based on a 3GPP NULL scheme. The authentication type can be an Extensible Authentication Protocol-Transport Layer Security (EAP-TLS) authentication procedure or another EAP authentication method selected based on the SUCI associated with the N5GC device. Additionally, selecting the authentication type can be at least partly in response to a Get Request message received at a Unified Data Management (UDM) of the 5G core network, the Get Request message including the SUCI associated with the N5GC device. In some instances, the SUPI is anonymous; and the authentication type is selected based on a domain portion of the SUPI.

In some examples, a method to authenticate a Non-Fifth Generation Capable (N5GC) device with a 5G core network comprises: sending an Identity Request message from a wireline-access gateway function (W-AGF) to the N5GC device, the W-AGF being connected to the N5GC device through a residential gateway (RG); receiving, at the W-AGF, an Identity Response message including a device identifier associated with the N5GC device; generating, at the W-AGF, a Registration Request message on behalf of the N5GC device including an N5GC indication; sending the Registration Request message from the W-AGF to an Access & Mobility Management Function (AMF) of the 5G core network; receiving, at the W-AGF and from the AMF, an Authentication Request message associated with the 5G core network in response to the Registration Request message; forwarding the Authentication Request message associated with the 5G core network to the N5GC device to cause the N5GC device to have an authenticated status with respect to the 5G core network; sending, from an Authentication Server Function (AUSF) of the 5G core network to a Unified Data Management (UDM) of the 5G core network, an Authentication Result Confirmation Request message including at least the device identifier associated with the N5GC device; and storing, at the UDM and in response to the Authentication Result Confirmation Request message, an indication of the authenticated status corresponding to the N5GC device. The method can further include authorizing, at the UDM, a registration request for the N5GC device at least partly in response to storing the indication of the authenticated status. Additionally, the method can include sending, from the UDM to the AUSF, a Registration Response message corresponding to the registration request to cause the AMF to send a Registration Accept message to the W-AGF.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure provide systems and methods to authenticate an N5GC device on an RG for a 5G core network. The systems disclosed herein identify, authenticate, and register the N5GC using a W-AGF which, with the RG, forms a wireline access network overcoming the lack of pre-installed hardware and software devices typically use to register and authenticate with the 5G core network. One function of the W-AGF is to act as a relay between the RG and various NFs of the 5G core network, such as an AMF of the 5G core network. The RG and the W-AGF form the wireline access network to create a communication pathway for the N5GC device to the AMF. Another function of the W-AGF is to implement techniques for generating, sending, and receiving various messages to perform the registration and authentication procedure.

For instance, in one implementation, the W-AGF generates a Registration Request message and sends the Registration Request message to the AMF of the 5G core network on behalf of the N5GC device. The Registration Request message includes an N5GC indicator and a device identifier associated with the N5GC device. The N5GC indicator is an explicit indication, separate from the device identifier, that the N5GC device is, in fact, a device lacking 5G capabilities or designed without 5G capabilities, (e.g., with an alphanumeric value or string providing this information to the AMF). The device identifier can be an NAI, and/or a SUCI based on the NAI. At least partly in response to the Registration Request message, the 5G core network selects an authentication method (e.g., a type of authentication), such as EAP-TLS, for the N5GC device. Various operations and steps to perform the registration and authentication procedure can be defined by the 3GPP standards, for instance, at TS 23.316, which defines protocols for authenticating N5GC devices 102 behind 5G-Cable Residential Gateways (CRG)s and Fixed Network (FN)-CRGs (e.g., at clause 4.10a).

Upon registering and authenticating the N5GC device, the 5G core network downloads the proper policy associated with the N5GC device. Accordingly, the N5GC device, which may have initially been configured without any 5G access components, gains access to the 5G core network and experiences various benefits of 5G services previously unavailable to N5GC devices. Other advantages of the systems and methods disclosed herein will become apparent from the details below.

Figure 1:
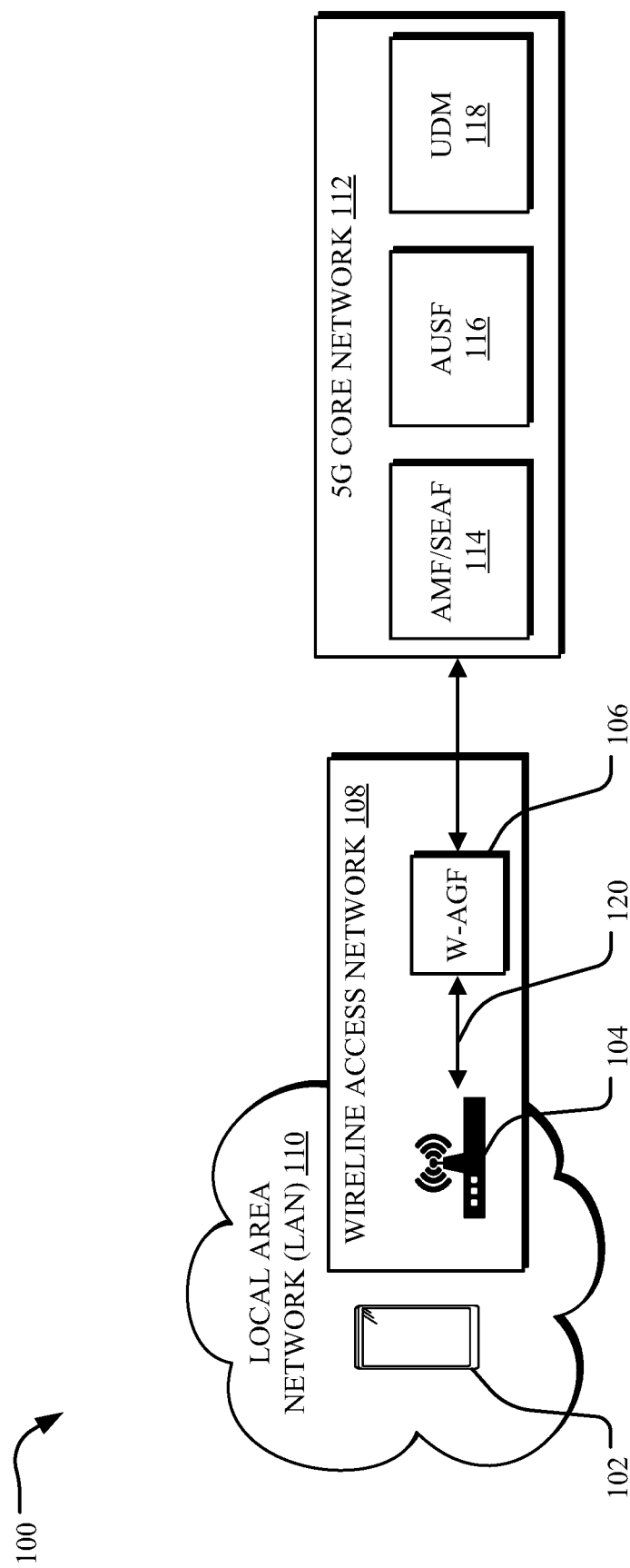
FIG. 1 illustrates an example system to authenticate an N5GC device on a residential gateway (RG), for a 5G core network.

FIG. 1 illustrates an example system 100 to authenticate and register a Non-5G Capable (N5GC) device 102 using a Residential Gateway (RG) 104 as a network access node. The techniques performed by the system 100 can be based on Extensible Authentication Protocol (EAP) and/or the Third Generation Partnership Project (3GPP) standards at TS 23.316.

In some examples, the RG 104 and/or a wireline-access gateway function (W-AGF) 106 form a wireline access network 108 to perform these techniques. For instance, the RG 104 can include a cable access modem, an Optical Line Termination (OLT) device, a broadband or Digital Subscriber Line (DSL) Unit, a remote hotspot unit, satellite access unit, combinations thereof, and/or other layer 2 access network technology (e.g., a home device). Some iterations may include layer 3 network technology using additional Network Function (NF) configurations. The W-AGF 106 can be a NF collocated with or in communication with the RG 104 (e.g., via a cable modem termination system (CMTS), a mobile termination system, a DSL termination unit, and the like). The W-AGF 106 can interface with an Access & Mobility Management Function (AMF) of the 5G core network 112. The W-AGF 106, which can be defined by 3GPP 5G standards, can also be located at a central office (CO) of a network provider (e.g., of the 5G core network 112). In some instances, the CMTS and the W-AGF 106 are collocated in a same server or housing, in a same rack, and/or in a same building. Additionally, in converged networks, the CMTS and the W-AGF 106 may be virtualized (e.g., at a remote server device). A cable operator, a mobile operator, a virtual network operator, and the like can implement the W-AGF 106. In other words, the wireline access network 108 can include the equipment (e.g., software and hardware components) for connecting devices at a local area network (LAN) 110 of the RG 104 with the 5G core network 112. Accordingly, the RG 104 and the W-AGF 106 of the wireline access network 108 can perform operations to authenticate and register the N5GC device 102 for the 5G core network 112.

In some examples, the RG 104 and the LAN 110 can include various types of wired and/or wireless networks, public and/or private networks, and the like. For instance, the RG 104 can include access network components such as Bluetooth®, Wi-Fi, ethernet, fiber, satellite, power-line communication (PLC), hybrid fiber coaxial (HFC), DSL, satellite, legacy systems (e.g., copper), and/or combinations thereof. Devices connecting to the RG 104 can use the RG 104 to receive internet, cable, and the like. Moreover, by using the connection of the RG 104 to the W-AGF 106, the wireline access network 108 can be configured to connect the LAN 110 and/or various devices connecting to the RG 104 to a cellular network, such as the 5G core network 112.

The 5G core network 112 can include 3GPP standard-defined NFs to send messages back and forth between the wireline access network 108 (e.g., using the W-AGF 106), and the core network 112 to perform the authentication and registration procedures described herein. For instance, the 5G core network 112 can include an Access and Mobility Management function with a Security Anchor Function (AMF/SEAF) 114 (e.g., collocated with the AMF); an Authentication Server Function (AUSF) 116; and/or a Unified Data Management (UDM) 118. The AMF portion of the AMF/SEAF 114 can provide primary control plane functions for the 5G core network 112, such as registration management, reachability management, connection management, mobility management, Next Generation Application Protocol (NGAP) signaling, packet data unit (PDU) session management, and other functions (e.g., as defined by 3GPP standards). The SEAF portion of the AMF/SEAF 114 can function as an EAP pass-through authenticator to the AUSF 116 (e.g., as a "middle-man" relay to connect the N5GC device 102 to the AUSF 116). The AUSF 116 can be configured to make authentication decisions based on information received from the N5GC device 102 and retrieved from other NFs of the 5G core network 112, such as the UDM 118. The UDM 118 can perform user identification handling, UE registration management functions, retrieval of subscription data, and other functions defined by 3GPP standards.

The N5GC device 102 can be a desktop computer, a laptop computer, a cellular or mobile device, a smart mobile device, a wearable device (e.g., a smart watch, smart glasses, a smart epidermal device, etc.) an Internet-of-Things (IoT) device, a smart home device, a medical device, a virtual reality (VR) or augmented reality (AR) device, a vehicle (e.g., a smart bicycle, an automobile computer, etc.), combinations thereof etc. The N5GC device 102 can lack other cellular capabilities, such as Fourth Generation (4G) or Long-Term Evolution (LTE). However, in some instances, the N5GC device 102 can have other cellular capabilities. For instance, the N5GC device 102 can be a 4G capable device and/or an LTE capable device. Nevertheless, the N5GC device 102 can lack some 5G capabilities, including Non-Access Stratum (NAS) keys and/or the derivation of a 5G key hierarchy. The system 100 can use various EAP-TLS messages between the N5GC device 102, the wireline access network 108, and the 5G core network 112 to overcome such issues. For instance, the W-AGF 106 can perform a registration procedure for the N5GC UE 102, as described in 3GPP standard TS 23.316.

In some examples, to perform the registration procedure, the W-AGF 106 creates the registration request on behalf of the N5GC device 102. 5G related parameters (including a key set identifier (ngKSI) and/or an Anti-Bidding-down Between Architecture) ABBA parameter) that may not be relevant to the N5GC device 102 are not sent to the N5GC device 102. Rather, when received from the AMF 114, the 5G related parameters can be ignored by the W-AGF 106 and/or omitted from one or more messages between the N5GC device 102 and the wireline access network 108. Moreover, in some instances of the system 100, neither the N5GC device 102 nor the AUSF 116 derive 5G related keys after EAP authentication.

In some instances, the system 100 can perform the authentication and registration procedure based on 3GPP standard TS 23.316, for instance, at clause 4.10a. For example, the system 100 can use EAP-TLS to generate and/or send messages. Other EAP methods can also be supported. Throughout the authentication and registration procedure, the W-AGF 106 can act on behalf of the N5GC device 102. The link(s) between the N5GC device 102 and the RG 104, and/or between the RG 104 and the W-AGF 106 can be any type of data link (e.g., layer 2) that can at least support EAP encapsulation. Moreover, the RG 104 can connect to the W-AGF 106 using one or more termination systems 120, such as a CMTS device, a satellite termination device, a mobile termination device, a DSL termination device, and the like.

Although the techniques discussed herein relate to authentication and registration for the core network 112, it is to be understand that similar techniques could be used for various combinations of 3GPP networks, such as a third generation (3G) network, a 4G network, an LTE, an LTE Advanced Network, a 5G network, a 5G New Radio (NR) network, combinations thereof and the like.

Figure 2:
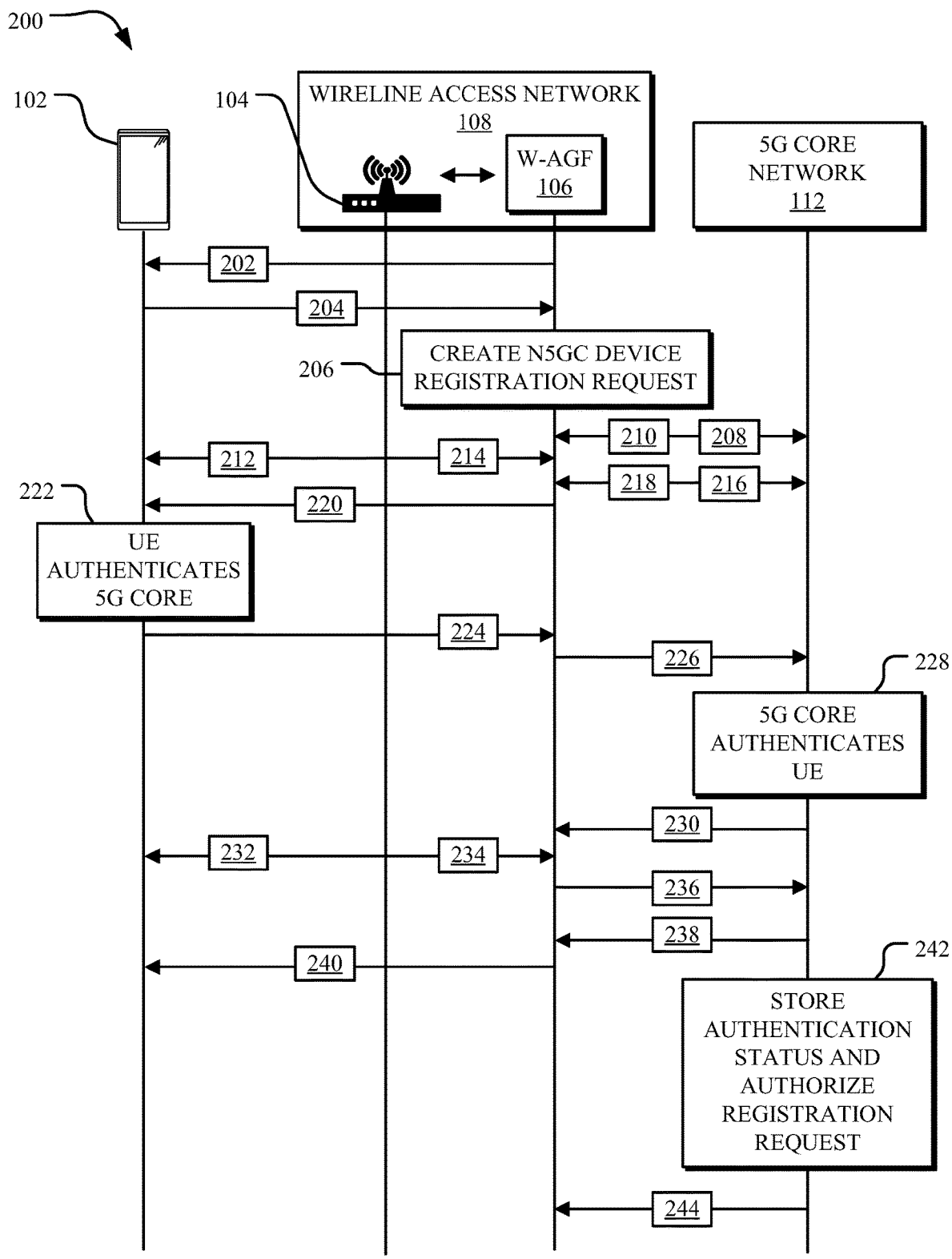
FIG. 2 illustrates an example call flow to authenticate an N5GC device on an RG, for a 5G core network, which can be implemented by the system of FIG. 1.

FIG. 2 illustrates an example call flow 200 to register the N5GC device 102 with the 5G core network 112, which can be implemented by the system 100.

To perform the call flow 200, the system 100 can connect the N5GC device 102 to the W-AGF 106 via the RG 104 using a layer 2 bridge. During an initial setup process for the LAN 110 (e.g., as the RG 104 establishes an Internet Protocol (IP) address for the N5GC device 102) the W-AGF 106 can initiate the EAP authentication procedure of the call flow 200 by sending an EAP request/Identity 202 to the N5GC device 102 using the RG 104, which can act as an L2 bridge device and forward an ethernet frame corresponding to the EAP request/identity to the N5GC device 102. This EAP message can be included in an L2 frame (e.g., using Extensible Authentication Protocol over LAN (EAPoL). In response, the N5GC device 102 can send back an EAP response/Identity 204, which can include a Network Access Identifier (NAI) value corresponding to the N5GC device 102 (e.g., in the form of "username@realm," or another alphanumeric identifier).

In some instances, TLS subscription identifier privacy protection (e.g., based on the standards "Section 2.1.4. Privacy" of RFC 5216 for TLS 1.2 or in RFC 8446 for TLS 1.3) may be supported and the "username" part of the EAP Response is either omitted or "anonymous." In this case, the "realm" part of the EAP response/identity 204 can include information (e.g., a subdomain such as "eap_tls.realm," or another alphanumeric identifier) to facilitate the authentication method or type selection by the UDM 118.

In some examples, the W-AGF 106 performs a registration request creation process 206 on behalf of the N5GC device 102 to create a registration request 208 (e.g., with an indication that the registration is on behalf of a device with limited or no 5G capabilities such as the NSGC device 102). A Subscription Permanent Identifier (SUPI) of the NSGC device 102 can be the Network Access Identifier (NAI) as received from the N5GC device 102. Moreover, the W-AGF 106 can construct a Subscription Concealed Identifier (SUCI) from this SUPI (e.g., using a 3GPP NULL scheme). Then the W-AGF 106 can select the AMF/SEAF 114 for sending the registration request 208.

In some instances, the W-AGF 106 sends the registration request 208 to the AMF/SEAF 114 of the 5G core network 112 on behalf of the N5GC device 102. The registration request 208 can include the NAI, the SUCI, a wireline network name if available, and/or one or more device capability indicators (e.g., indicating the device, such as the N5GC device 102, is non-5G capable). The AMF/SEAF 114 can select the AUSF 116 based on the SUCI in the received registration request 208, and send a Nausf_UEAuthentication_Authenticate Request message to the AUSF 116. This message can contain the SUCI of the N5GC device 102, and an indicator that the request is on behalf of the N5GC device 102. The AUSF 116 can then send a Nudm_UEAuthentication_Get Request to the UDM 118. The Nudm_UEAuthentication_Get Request can contain the SUCI of the N5GC device 102 and may also include the Non-5G capable indicator.

In some examples, the UDM 118 invokes a subscriber identity de-concealing function (SIDF) to map the SUCI to the SUPI, and can select an authentication method or type, (e.g., EAP-TLS) based on the SUPI. In scenarios where the "username" part of the SUPI is "anonymous" or omitted, the UDM 118 may select an authentication method or type based on the "realm" part of the SUPI, the N5GC device 102 indicator, a combination of the "realm" part and the N5GC device 102 indicator, or the UDM local policy. The UDM 118 can send a Nudm_UEAuthentication_Get Response to the AUSF 116, which can contain the SUPI of the N5GC device 102 and an indicator of the selected authentication method or type of authentication, e.g., EAP-TLS.

In some instances, the AUSF 116 starts EAP-TLS by sending to the AMF/SEAF 114 of the 5G core network 112 a Nausf_UEAuthentication_Authenticate Response message containing an EAP-Request message of EAP-type=EAP-TLS with the Start (S) bit set, denoted as EAP-Request/EAP-TLS [TLS start]. The AMF/SEAF 114 can forward the EAP-Request/EAP-TLS [TLS start] in an Authentication Request message 210 to the W-AGF 106.

After receiving the EAP-Request/EAP-TLS [TLS start] message in the Authentication Request message 210 from AMF/SEAF 114, the W-AGF 106 can forward the EAP-Request/EAP-TLS [TLS start] message to the N5GC device 102 in an L2 message 212, omitting the ABBA and ngKSI parameters in the L2 message 212. Upon receiving the EAP-Request/EAP-TLS [TLS start] message from the W-AGF 106, the N5GC device 102 can reply to the W-AGF 106 with an EAP-Response/EAP-TLS message 214 whose data field can include a TLS client_hello message. Such EAP-Response message 214, denoted as EAP-Response/EAP-TLS [client_hello], can be included in an L2 message.

In some examples, The W-AGF 106 can forward the EAP-Response/EAP-TLS [client_hello] to the AMF/SEAF 114 of the 5G core network 112 in an Authentication Response message 216.

The AMF/SEAF 114 can forward the EAP-Response/EAP-TLS [client_hello] message to the AUSF 116 in a Nausf_UEAuthentication_Authenticate Request message. The AUSF 116 can reply to the AMF/SEAF 114 with an EAP-Request/EAP-TLS message whose data field includes a TLS server_hello message; a TLS server certificate message; a TLS server_key_exchange message; a TLS client certificate_request message; and/or a TLS server_hello_done message. This EAP-Request message, denoted as EAP-Request/EAP-TLS [server_hello], can be included in a Nausf_UEAuthentication_Authenticate Response message.

In some instances, the AMF/SEAF 114 of the 5G core network 112 forwards the EAP-Request/EAP-TLS [server_hello] message to the W-AGF 106 in an Authentication Request message 218. The W-AGF 106 can forward the EAP-Request/EAP-TLS [server_hello] to the N5GC device 102 in an L2 message 220.

In some instances, the N5GC device 102 performs an authentication operation 222 to authenticate the AUSF 116 by validating the server certificate included in the EAP-Request/EAP-TLS [server_hello] message received from the W-AGF 106. The N5GC device 102 can be provisioned with certificates of a trust anchor to validate the AUSF server certificate. In addition, the N5GC device 102 can be provisioned with its own client certificate. If the TLS server authentication is successful, then the N5GC device 102 can reply to the W-AGF 106 with an EAP-Response/EAP-TLS message 224 (e.g., as an L2 message). The data field of the EAP-Response/EAP-TLS message 224 can contain a TLS client certificate message; a TLS client_key_exchange message; a TLS certificate_verify message; a TLS change_cipher_spec message; and/or TLS finished message. This EAP Response message can be denoted as EAP-Response/EAP-TLS [client_certificate]. The W-AGF 106 can forward the EAP-Response/EAP-TLS [client_certificate] to the AMF/SEAF 114 of the 5G core network 112 in an Authentication Response message 226.

Upon receiving the Authentication Response message 226, the AMF/SEAF 114 can forward the EAP-Response/EAP-TLS [client_certificate] message to the AUSF 116, for instance, in a Nausf_UEAuthentication_Authenticate Request message. The AUSF 116 can perform an authentication operation 228 to authenticate the N5GC device 102 by verifying the client certificate received in the EAP-Response/EAP-TLS message 224. Among other validations, the AUSF 116 can verify that the client certificate is issued by a certificate authority trusted by the AUSF 116. If the client certificate is verified successfully, the AUSF 116 can continue to perform additional steps discussed below. Otherwise, the AUSF 116 can return an EAP-failure message. The AUSF 116 can be provisioned with certificates of trust anchor to verify client certificates associated with the N5GC device 102.

In some examples, such as when the client certificate is successfully verified, the AUSF 116 can send, to the AMF/SEAF 114, an EAP-Request/EAP-TLS message with its data field including a TLS change_cipher_spec message and a TLS server finished. This EAP-Request message can be denoted as EAP-Request/EAP-TLS [server_finished and can be included in a Nausf_UEAuthentication_Authenticate Response message.

In some examples, the AMF/SEAF 114 of the 5G core network 112 forwards an EAP-Request/EAP-TLS [server_finished] message to the W-AGF 106 in an Authentication Request message 230. The W-AGF 106 can forward the EAP-Request/EAP-TLS [server_finished] message to the N5GC device 102 in an L2 message 232. In response, the N5GC device 102 can send to the W-AGF 106 an EAP-Response/EAP-TLS message 234 with a data field set to empty, denoted as EAP-Response/EAP-TLS [empty] (e.g., in an L2 message)

In some instances, the W-AGF 106 forwards the EAP-Response/EAP-TLS [empty] message to the AMF/SEAF 114 of the 5G core network 112 in an Authentication Response message 236.

Upon receiving the Authentication Response message 236, the AMF/SEAF 114 can forward the EAP-Response/EAP-TLS [empty] message to the AUSF 116 in a Nausf_UEAuthentication_Authenticate Request message. In response, the AUSF 116 can send to the AMF/SEAF 114 an EAP-Success message along with the SUPI in a Nausf_UEAuthentication_Authenticate Response message. The AUSF 116 may omit or avoid performing a derivation of a KAusF anchor key or a KsEAF anchor key based on the indicator that the device (e.g., the N5GC device 102) is non-5G capable (e.g., received in the registration request 208). As such, the AUSF 116 may omit or avoid sending the KsEAF anchor key to the AMF/SEAF 114.

In some instances, the AMF/SEAF 114 forwards, to the W-AGF 106, an EAP-Success message 238 in an Authentication Result message or a Security Mode Command message. The W-AGF 106 can forward to the N5GC device 102 the EAP-Success message 238 in an L2 message 240, and the authentication procedure can be considered complete.

Operations described above regarding the exchange of EAP-TLS between the AUSF 116 and the N5GC device 102 can be based on the 3GPP standard TLS 1.2 without subscription identifier privacy protection. However, in some scenarios, the system 100 may provide subscription identifier privacy for the N5GC UE 102 in the TLS layer. For instance, an EAP-TLS server can include additional configurations to support privacy either inherently (e.g., in TLS 1.3) or via separate privacy option (e.g., in TLS 1.2). When TLS 1.2 is used, the N5GC device 102 may behave as described in "Section 2.1.4. Privacy" of RFC 5216 [38], where instead of sending the client certificate in cleartext over the air, the N5GC device 102 can send a first TLS certificate (no cert) during a first TLS handshake and a second TLS certificate (client certificate) during the second TLS handshake within the TLS session negotiated from the first TLS handshake.

In some instances, the AUSF 116 and the N5GC device 102 can avoid or omit performing further 5G related key derivation from an Extended Master Session Key (EMSK), in response to neither 5G Access Stratum (AS) nor 5G Non-Access Stratum (NAS) security being used.

By way of example, the AUSF 116 can send a UDM_Nudm_UEAuthentication ResultConfirmation Request message to the UDM 118, including the SUPI obtained from the TLS client certificate, SN-name, the type of authentication or authentication method (e.g., EAP-TLS), the authentication result, and/or a timestamp. Accordingly, the UDM 118 can store the authentication result (e.g., at an authentication operation 242).

Furthermore, the UDM 118 can send a UDM_Nudm_UEAuthenticationResultConfirmation Response message to the AUSF 116. The AMF 114 can send a Nudm_UEContextManagement Registration Request message to the UDM 118 in response. Accordingly, the UDM 118 can authorize the registration request based on the authentication result stored in at the authentication operation 242, and other information (e.g., a UE subscription profile). The UDM 118 can send a Nudm_UEContextManagement_Registration Response message to the AMF 114. Finally, the AMF 114 can send a Registration Accept message 244 to the W-AGF 106, confirming that the registration process is successful. In some instances, in response to receiving the Registration Accept message 244, the AMF 114 can send a Registration Accept message to the W-AGF 106.

Figure 3:
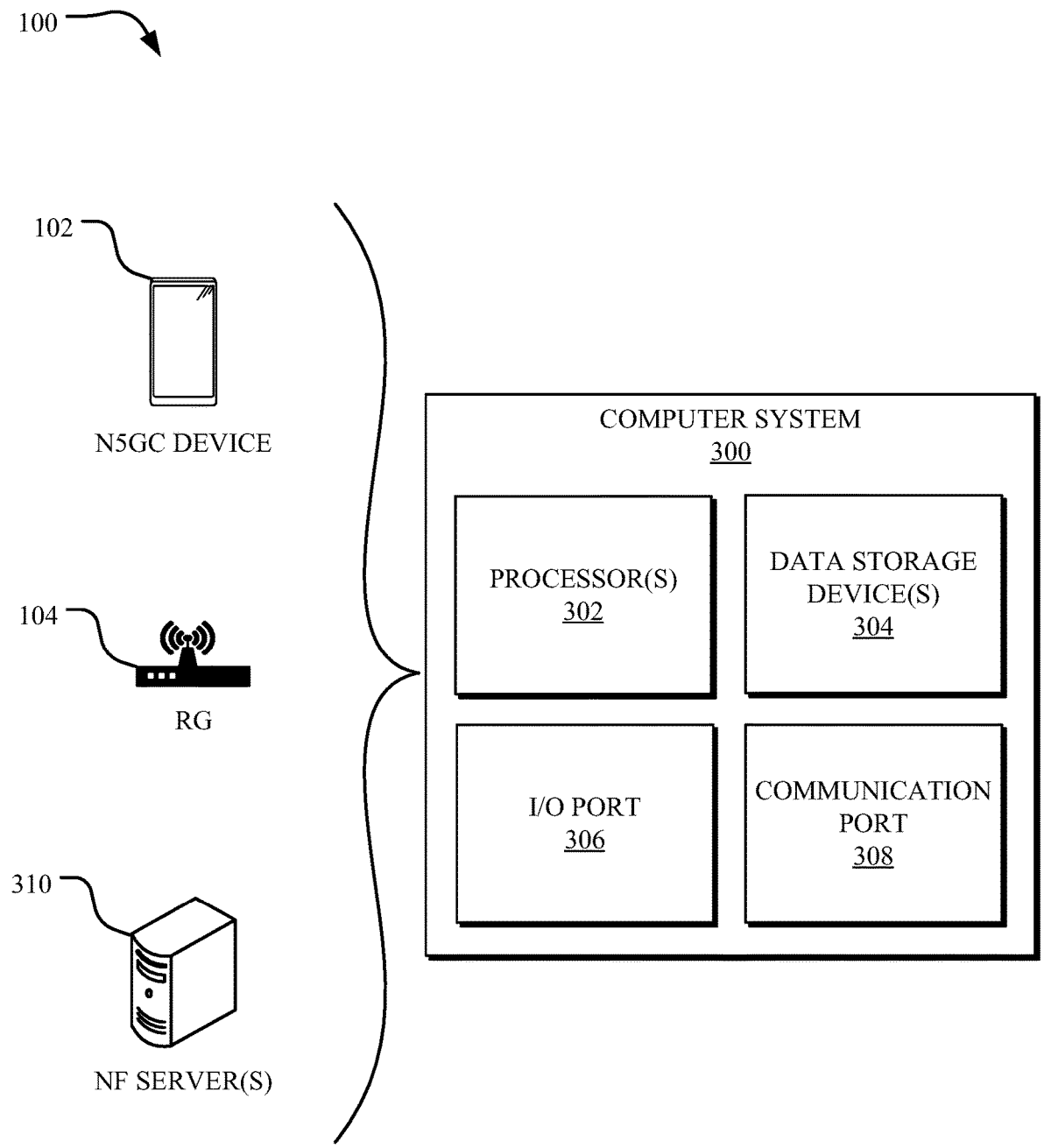
FIG. 3 illustrates example computer system(s) for authenticating an N5GC device on an RG, for a 5G core network, which can form at least a portion of the system of FIG. 1.

FIG. 3 illustrates an example of one or more computer system(s) 300 which may form at least a portion of any of the system 100. The computer system 300 depicted in FIG. 3 can represent the N5GC device 102 and/or hardware components such as the wireline access network 108 (e.g., the RG 104 and/or the W-AGF 106), and/or the 5G core network 112 (e.g., the AMF/SEAF 114, the AUSF 116, the UDM 118, and/or other NFs of the 5G core network). It will be appreciated that specific implementations of these devices may have differing possible specific computing architectures not all of which are specifically discussed herein but will be understood by those of ordinary skill in the art.

The computer system(s) 300 may be capable of executing one or more computer program products to execute a computer process. Data and program files may be input to the computer system 300, which reads the files and executes the programs therein. The computer system(s) 300 can include one or more hardware processors 302, one or more data storage devices 304, one or more I/O ports 306, and/or one or more communication ports 308. Additionally, other elements that will be recognized by those skilled in the art may be included in the computer system 300. Elements of the computer system 300 may communicate with one another by way of one or more communication buses, point-to-point communication paths, network interfaces, or other communication means.

In some instances, the computer system(s) 300 forming at least a portion of the N5GC device 102 can be a desktop computer, a laptop computer, a cellular or mobile device, a smart mobile device, a wearable device (e.g., a smart watch, smart glasses, a smart epidermal device, etc.) an Internet-of-Things (IoT) device, a smart home device, a medical device, a virtual reality (VR) or augmented reality (AR) device, a vehicle (e.g., a smart bicycle, an automobile computer, etc.), combinations thereof, and the like.

The processor 302 includes, for example, a central processing unit (CPU), a microprocessor, a microcontroller, a digital signal processor (DSP), and/or one or more internal levels of cache. There can be one or more processors 302, such that the processor 302 comprises a single central-processing unit, or a plurality of processing units capable of executing instructions and performing operations in parallel with each other, referred to as a parallel processing environment.

The computer system 300 may be a stand-alone computer, a distributed computer, or any other type of computer, such as one or more external computers made available via a cloud computing architecture. The presently described technology is optionally implemented in software stored on the data storage device(s) 304 (e.g., the one or more memory device(s) 304), and/or communicated via one or more of the I/O port(s) 306 and/or communication port(s) 308, thereby transforming the computer system 300 in FIG. 3 to a special purpose machine for implementing the operations described herein. Examples of the computer system 300 include personal computers, terminals, microcontrollers, base stations, workstations, mobile phones, tablets, laptops, personal computers, multimedia consoles, gaming consoles, set top boxes, and the like.

The one or more data storage device(s) 304 may include any non-volatile data storage device capable of storing data generated or employed within the computer system 300, such as computer-executable instructions for performing a computer process, which may include instructions of both application programs and an operating system (OS) that manages the components of the computer system 300. The data storage device(s) 304 may include, without limitation, magnetic disk drives, optical disk drives, solid state drives (SSDs), flash drives, and the like. The data storage devices 304 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The data storage device(s) 304 may include volatile memory (e.g., dynamic random-access memory (DRAM), static random-access memory (SRAM), etc.) and/or non-volatile memory (e.g., read-only memory (ROM), flash memory, etc.). The data storage device 304 may include a non-transitory machine-readable medium having stored thereon instructions, which may be used to program the computer system 300 (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

Computer program products containing mechanisms to effectuate the systems and methods in accordance with the presently described technology may reside in the data storage device(s) 304, which may be referred to as machine-readable media. For instance, the NFs discussed herein (e.g., the W-AGF 106 of the wireline access network 108, the AMF/SEAF 114, the AUSF 116, the UDM 118, and/or other NFs of the 5G core network, and the like) can be stored and/or executed at one or more NF server(s) 310. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures. The machine-readable media may store instructions that, when executed by the processor, cause the systems to perform the operations disclosed herein.

In some implementations, the computer system 300 includes one or more ports, such as the one or more input/output (I/O) port(s) 306 and the one or more communication port(s) 308, for communicating with other computing devices or network functions. It will be appreciated that the I/O port(s) 306 and the communication port(s) 308 may be combined or separate and that more or fewer ports may be included in the computer system 300.

The I/O port(s) 306 may be connected to an I/O device, or other device, by which information is input to or output from the computer system 300. Such I/O devices may include, without limitation, one or more input devices, output devices, and/or environment transducer devices. In some instances, the input devices convert a human-generated signal, such as, human voice, physical movement, physical touch or pressure, and/or the like, into electrical signals as input data into the computer system 300 via the I/O port 306. Similarly, the output devices may convert electrical signals received from computer system 300 via the I/O port 306 (or generated by the computer system 300) into signals that may be sensed as output by a human, such as sound, light, and/or touch. The input device may be an alphanumeric input device, including alphanumeric and other keys for communicating information and/or command selections to the processor 302 via the I/O port 306. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a projector, a speaker, a tactile and/or haptic output device, and/or the like. In some implementations, the input device and the output device may be the same device, for example, in the case of a touchscreen.

In some implementations, a communication port 308 is connected to a network by way of which the computer system 300 may receive network data useful in executing the methods and systems set out herein as well as transmitting information and network configuration changes determined thereby. For instance, the communication port 308 may use any of the 3GPP access layer protocols, interfaces, and messages discussed. Examples of such networks or connections include, without limitation, the 4G, LTE, and/or 5G 3GPP standards-based interfaces, Universal Serial Bus (USB), Ethernet, Wi-Fi, Bluetooth®, Near Field Communication (NFC) and so on. Further, the communication port 308 may communicate with an antenna or other link for electromagnetic signal transmission and/or reception.

In an example implementation, operations performed by the system 100, the call flow 200, and the method 400

(discussed below regarding FIG. 4) may be embodied by instructions stored on the data storage devices 304 and executed by the processor 302. Furthermore, methods disclosed herein may be implemented as sets of instructions or software readable by the processor 302. Further, it is understood that the specific order or hierarchy of steps in the methods disclosed are instances of example approaches. Any accompanying method claims present elements of the various steps in a sample order, and are not necessarily meant to be limited to the specific order or hierarchy presented (unless explicitly recited), for instance, when implemented as the sets of instructions or software executed by the computer system 300.

The computer system 300 set forth in FIG. 3 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Figure 4:
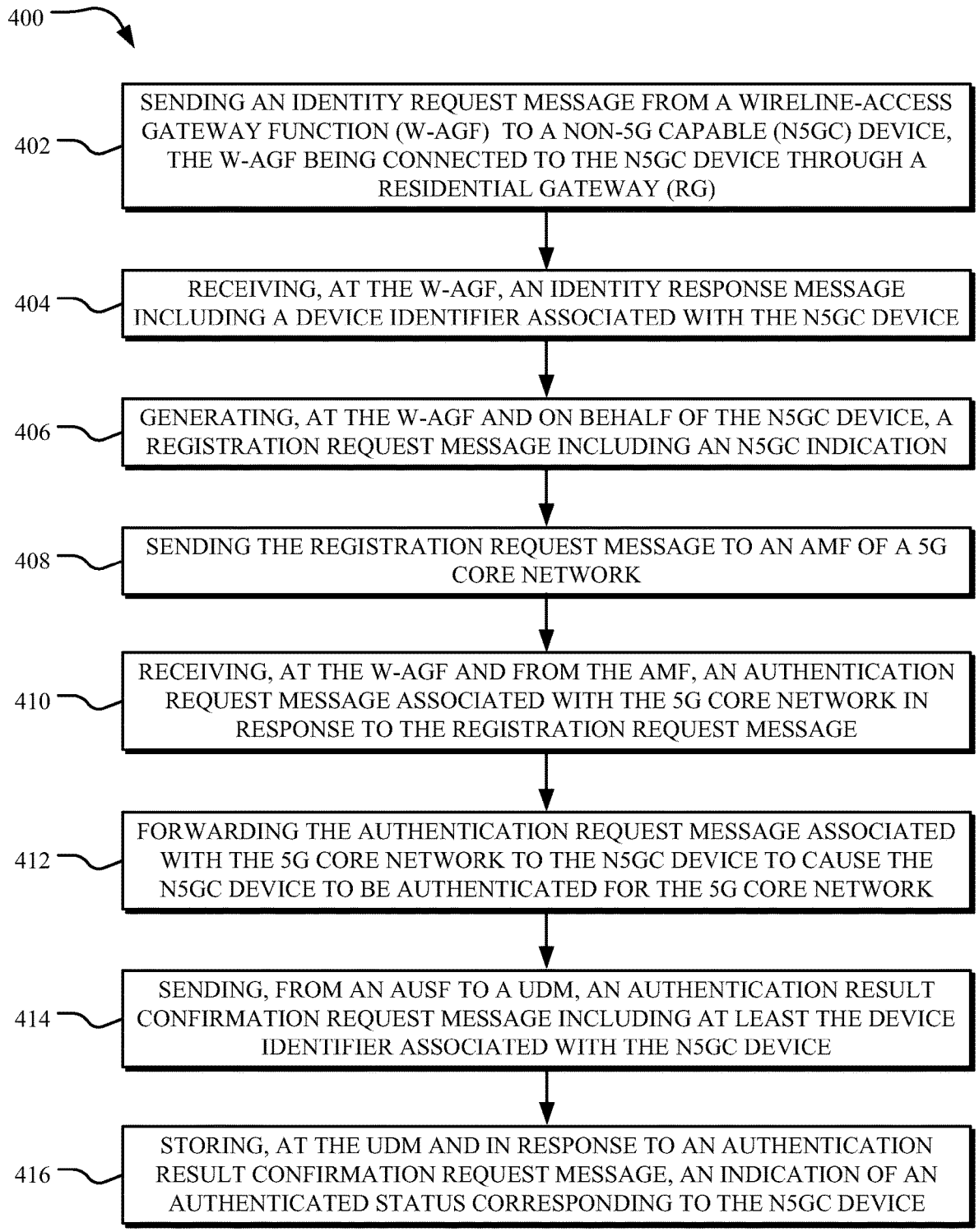
FIG. 4 illustrates an example method to authenticate an N5GC device on an RG, for a 5G core network, which can be performed by the system of FIG. 1.

FIG. 4 illustrates an example method 400 to register and authenticate the N5GC device 102 on the RG 104 for the 5G core network 112 which can be performed by the system 100, the call flow 200, and/or the computer system 300.

At operation 402, the method 400 sends an Identity Request message from a W-AGF to an N5GC device, the W-AGF being connected to the N5GC device through an RG. At operation 404, the method 400 receives, at the W-AGF, an Identity Response message including a device identifier associated with the N5GC device. At operation 406, the method 400 generates, at the W-AGF and on behalf of the N5GC device, a Registration Request message including an N5GC indication. At operation 408, the method 400 sends the Registration Request message to an AMF of a 5G core network. At operation 410, the method 400 receives, at the W-AGF and from the AMF, an Authentication Request message associated with the 5G core network in response to the Registration Request message. At operation 412, the method 400 forwards the Authentication Request message associated with the 5G core network to the N5GC device to cause the N5GC device to be authenticated for the 5G core network. At operation 414, the method 400 sends, from AUSF to a UDM, an Authentication Result Confirmation Request message including at least the device identifier associated with the N5GC device. At operation 416, the method 400 stores, at the UDM and in response to an Authentication Result Confirmation Request message, an indication of an authenticated status corresponding to the N5GC device.

It is to be understood that the specific order or hierarchy of steps in the methods depicted in FIG. 4 are instances of example approaches and can be rearranged while remaining within the disclosed subject matter. For instance, any of the steps depicted in FIG. 4 may be omitted, repeated, performed in parallel, performed in a different order, and/or combined with any other of the steps depicted in FIG. 4.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

What is claimed is:

1. A method to authenticate a Non-Fifth Generation Capable (N5GC) device with a Fifth Generation (5G) core network, the method comprising:
sending an Identity Request message from a wireline-access gateway function (W-AGF) to the N5GC device, the W-AGF being connected to the N5GC device through a residential gateway (RG);
receiving, at the W-AGF, an Identity Response message including a device identifier associated with the N5GC device;
generating, at the W-AGF and on behalf of the N5GC device, a Registration Request message including an N5GC indication;
sending the Registration Request message to an Access & Mobility Management Function (AMF) of the 5G core network;
receiving, at the W-AGF and from the AMF, an Authentication Request message associated with the 5G core network in response to the Registration Request message; and
forwarding the Authentication Request message associated with the 5G core network to the N5GC device to cause the N5GC device to be authenticated for the 5G core network.

2. The method of claim 1, wherein causing the N5GC device to be authenticated for the 5G core network includes validating, at the N5GC device, a server certificate associated with the 5G core network included in the Authentication Request message.

3. The method of claim 1, wherein the Identity Request message is an Extensible Authentication Protocol (EAP) Request/Identity message.

4. The method of claim 1, wherein the Registration Request message includes a Subscription Permanent Identifier (SUPI) based on a Network Access Identifier (NAI) associated with the N5GC device.

5. The method of claim 4, wherein the NAI includes a username portion and a domain portion.

6. The method of claim 5, wherein the W-AGF generates the Registration Request message at least partly in response to the domain portion of the NAI.

7. The method of claim 5, wherein the W-AGF generates the Registration Request message at least partly in response to the username portion of the NAI.

8. The method of claim 1, wherein generating the Registration Request message includes adding the NSGC indication to a message based at least partly on a Third Generation Partnership Project (3GPP) standard to authenticate devices behind 5G-Cable Residential Gateways (CRG)s and Fixed Network (FN)-CRGs.

9. The method of claim 1, wherein the RG connects to the W-AGF using a termination system.

10. The method of claim 9, wherein the termination system includes a Cable Modem Termination System (CMTS) device, a satellite termination device, on Optical Line Termination (OLT) device, or a Digital Subscriber Line (DSL) termination device.

11. The method of claim 10, wherein the termination system is collocated with the W-AGF at a Central Office (CO) associated with the 5G core network.

12. The method of claim 1, wherein the NSGC device connects to the W-AGF via the RG which is a layer 2 bridge mode or layer 3 gateway mode.

13. A method to authenticate a Non-Fifth Generation Capable (N5GC) device with a Fifth Generation (5G) core network, the method comprising:
generating, at a wireline-access gateway function (W-AGF), a Registration Request message on behalf of the N5GC device and in response to an Identity Response message associated with the N5GC device, the Registration Request message including a Subscription Concealed Identifier (SUCI) associated with the N5GC device and an N5GC indication;
sending the Registration Request message from the W-AGF to an Access & Mobility Management Function (AMF) of the 5G core network;
sending, using the AMF, a first Authentication Request message to an Authentication Server Function (AUSF) of the 5G core network based on the SUCI associated with the N5GC device, the first Authentication Request message including the SUCI and the N5GC indication;
selecting, at least partly in response to the first Authentication Request message, an authentication type for the N5GC device;
receiving, at the W-AGF and from the AMF, a second Authentication Request message associated with the 5G core network including an indication of the authentication type; and
forwarding the second Authentication Request message associated with the 5G core network to the N5GC device to cause the N5GC device to be authenticated for the 5G core network.

14. The method of claim 13, wherein the second Authentication Request message omits a key set identifier and an Anti-Bidding-down Between Architecture (ABBA) parameter in response to the N5GC indication.

15. The method of claim 13, further including constructing, at the W-AGF, the SUCI using a Network Access Identifier (NAI) as a Subscription Permanent Identifier (SUPI) based on a 3GPP NULL scheme.

16. The method of claim 15, wherein the authentication type is an Extensible Authentication Protocol-Transport Layer Security (EAP-TLS) authentication procedure or another EAP authentication method selected based on the SUPI associated with the N5GC device.

17. The method of claim 15, wherein:
the SUPI is anonymous; and
the authentication type is selected based on a domain portion of the SUPI.

18. The method of claim 13, wherein selecting the authentication type is at least partly in response to a Get Request message received at a Unified Data Management (UDM) of the 5G core network, the Get Request message including the SUCI associated with the N5GC device.

19. A method to authenticate a Non-Fifth Generation Capable (NSGC) device with a Fifth Generation (5G) core network, the method comprising:
sending an Identity Request message from a wireline-access gateway function (W-AGF) to the NSGC device, the W-AGF being connected to the NSGC device through a residential gateway (RG);
receiving, at the W-AGF, an Identity Response message including a device identifier associated with the NSGC device;
generating, at the W-AGF, a Registration Request message on behalf of the NSGC device including an NSGC indication;
sending the Registration Request message from the W-AGF to an Access & Mobility Management Function (AMF) of the 5G core network;
receiving, at the W-AGF and from the AMF, an Authentication Request message associated with the 5G core network in response to the Registration Request message;
forwarding the Authentication Request message associated with the 5G core network to the NSGC device to cause the NSGC device to have an authenticated status with respect to the core network;
sending, from an Authentication Server Function (AUSF) of the 5G core network to a Unified Data Management (UDM) of the 5G core network, an Authentication Result Confirmation Request message including at least the device identifier associated with the NSGC device; and
storing, at the UDM and in response to the Authentication Result Confirmation Request message, an indication of the authenticated status corresponding to the NSGC device.

20. The method of claim 19, further including authorizing, at the UDM, a registration request for the N5GC device at least partly in response to storing the indication of the authenticated status.

21. The method of claim 20, further including sending, from the UDM to the AUSF, a Registration Response message corresponding to the registration request to cause the AMF to send a Registration Accept message to the W-AGF.

* * * * *